United States Patent
Liu et al.

(10) Patent No.: US 10,971,984 B2
(45) Date of Patent: Apr. 6, 2021

(54) LINEAR VIBRATION MOTOR

(71) Applicant: TOPRAY MEMS INC., Hsinchu (TW)

(72) Inventors: Chin-Sung Liu, Hsinchu (TW); Shin-Ter Tsai, Hsinchu (TW); Hsiao-Ming Chien, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 171 days.

(21) Appl. No.: 16/421,514

(22) Filed: May 24, 2019

(65) Prior Publication Data
US 2020/0313531 A1    Oct. 1, 2020

(30) Foreign Application Priority Data
Mar. 29, 2019    (TW) .................................. 108111214

(51) Int. Cl.
*H02K 33/10*    (2006.01)
*G08B 6/00*    (2006.01)

(52) U.S. Cl.
CPC .............. *H02K 33/10* (2013.01); *G08B 6/00* (2013.01)

(58) Field of Classification Search
CPC ........ H02K 33/00; H02K 33/02; H02K 33/10; H02K 33/16; H02K 33/18; H02K 411/00; H02K 5/00; H02K 5/24; H01F 7/00; H01F 7/08; H01F 7/088; H01F 7/1615; H01F 7/1646; H01F 7/16; B06B 1/00
USPC .......................................... 310/15, 36, 12.01
See application file for complete search history.

(56) References Cited

U.S. PATENT DOCUMENTS

| 8,987,951 B2 * | 3/2015 | Park .................. H02K 33/16 310/25 |
| 10,307,790 B2 * | 6/2019 | Pu ..................... H02K 33/16 |

* cited by examiner

*Primary Examiner* — Tran N Nguyen
*Assistant Examiner* — Leda T Pham
(74) *Attorney, Agent, or Firm* — Lin & Associates Intellectual Property, Inc.

(57) ABSTRACT

A linear vibration motor includes a fixed portion, a movable portion, and a suspension portion; the fixed portion further includes an outer frame, a coil set, a conductive sheet set, a connecting circuit and a terminal; the movable portion includes a bracket, a primary magnet set, at least a secondary magnet set; the suspension portion includes a pair of elastic members connected to the fixed portion and the movable portion, and provides a restoring force when the movable portion is displaced; the coil set and the primary magnet set provide a driving force to drive the movable portion to generate vibration; the conductive sheet set and the secondary magnet set provide damping when the movable portion moves.

20 Claims, 5 Drawing Sheets

LINEAR VIBRATION MOTOR

CROSS-REFERENCE TO RELATED APPLICATION

The present application is based on, and claims priority form, Taiwan Patent Application No. 108111214, filed Mar. 29, 2019, the disclosure of which is hereby incorporated by reference herein in its entirety.

TECHNICAL FIELD

The technical field generally relates to a linear vibration motor, in particularly, to a linear vibration motor provided with at least a set of magnets in the structure.

BACKGROUND

The typical mobile devices and wearable devices must be equipped with a vibrating motor to provide a vibration as a tactile feedback when the user operates the device. Since the linear vibration motor can provide a variety of vibration modes, the linear vibration motor is currently the first choice for the configuration of mobile devices and wearable devices.

The linear vibration motor usually generates motion by driving a magnet carried by a movable portion through a driving coil of a fixed portion, and the movable portion is coupled to the fixed portion by an elastic mechanism; in other words, the elastic mechanism supports the movable portion and also provides a restoring force required when the movable portion is displaced to generate vibration.

However, since the mobile device may be affected by external force shaking, the movable portion of the linear vibration motor can also be shaken accordingly; when the extent of shaking is excessively large, the movable portion may hit the fixed portion to cause noise.

U.S. Pat. No. 7,358,633 B2 discloses the use of a magnetic fluid attached to the movable portion, wherein the magnetic fluid is the first to contact with the movable portion to reduce noise on impact. In addition, there is also a conventional linear vibration motor that coats the magnetic fluid between the driving coil and the magnet carried by the movable portion to provide resistance when the movable portion moves.

SUMMARY

The present invention provides a linear vibration motor which, by arranging an electric conductor, generates an induced current when the electric conductor moves with respect to a magnetic field, thereby resisting the relative motion and exhibiting a repulsive force to slow the vibration.

To achieve the above object, the present invention provides a linear vibration motor having a structure comprising at least: a fixed portion, a movable portion, and a supporting portion; the fixed portion further comprising an outer frame, a coil set, and a conductive sheet assembly; the movable portion comprising a bracket, a main magnet set, and at least a secondary magnet set, the bracket carrying the main magnet set and the secondary magnet set, the main magnet set being located at an intermediate portion of the bracket of the movable portion, and the secondary magnet set being located at one or both ends of the movable portion along a moving direction, and located on a side of the motor having a larger area, the secondary magnet set comprising at least a secondary magnet, and the secondary magnets of the secondary magnet set being magnetized in a direction along a thinner side of the motor; the support portion comprising a pair of elastic members, connected to the fixed portion and the movable portion, and providing a restoring force when the movable portion being displaced, the elastic members including a first connecting part, an elastic part and a second connecting part, the first connecting part of the elastic member being fixed to the outer frame of the fixed portion, and the second connecting part of the elastic member being fixed to the bracket of the movable portion; the coil set being located between the outer frame and the main magnet set, fixed to the outer frame, with a gap from the main magnet set, the coil set and the main magnet set provide driving to move the movable portion to generate vibration; the conductive sheet assembly being located on a side of the motor having a larger area, at a position corresponding to the secondary magnet set, and with a gap from the secondary magnet set, and the conductive sheet assembly and the second magnet set providing the resistance when the movable portion being in motion.

In a preferred embodiment, the main magnet set comprises at least two main magnets arranged according to the moving direction of the movable portion, wherein the magnetization direction of the main magnets is parallel to the moving direction, and the adjacent main magnets are magnetized in the opposite directions.

In a preferred embodiment, each secondary magnet set comprises a secondary magnet and the secondary magnet is magnetized in a direction with polarity to outside of the motor the same as polarity of a nearby main magnet to the outside of the motor.

In a preferred embodiment, each secondary magnet set comprises a secondary magnet, and the secondary magnet is divided into a plurality of regions along the moving direction and each region is magnetized alternately in direction, the adjacent regions have opposite magnetization directions, and the region closest to center of the moving direction is magnetized in a direction with polarity to outside of the motor the same as polarity of a nearby main magnet to the outside of the motor.

In a preferred embodiment, wherein each secondary magnet set comprises a plurality of secondary magnets, and the secondary magnet closest to the center of the moving direction is magnetized in a direction with polarity to outside of the motor the same as polarity of a nearby main magnet to the outside of the motor; the remaining secondary magnets are arranged along the moving direction, and the adjacent secondary magnets have opposite magnetization directions.

In a preferred embodiment, the secondary magnet set further comprises a magnetic conductive sheet made of a ferromagnetic material having a high magnetic susceptibility and a saturation magnetization, the magnetic conductive sheet being located between the bracket and the secondary magnet set, and the area of the magnetic conductive sheet is greater than half of the total area of the associated secondary magnet set.

In a preferred embodiment, the outer frame comprises a closed surface, and the conductive sheet assembly is located inside the closed surface; the coil set is located between the closed surface of the outer frame and the main magnet set.

In a preferred embodiment, wherein the outer frame has a semi-closed surface, and the conductive sheet assembly forms a closed surface with the semi-closed surface; the coil set is located between the closed surface and the main magnet set.

In a preferred embodiment, each conductive sheet of the conductive sheet assembly is made of a metal or alloy having a higher electrical conductivity, and the area thereof is no less than the area of the corresponding secondary magnet set.

In a preferred embodiment, the coil set surrounds the main magnet set and is placed in a position symmetrical with the moving direction of the main magnet set.

In a preferred embodiment, the linear vibration motor further comprises a connection line and at least one terminal to connect the coil set and a circuit for driving the motor.

Another embodiment of the present invention provides a linear vibration motor having a structure comprising at least: a fixed portion, a movable portion, and a supporting portion; the fixed portion further comprising an outer frame, a coil set, and at least a secondary magnet set; the movable portion comprising a bracket, a main magnet set, and a conductive sheet assembly, the bracket carrying the main magnet set and the conductive sheet assembly, the main magnet set being located at an intermediate portion of the bracket of the movable portion, and the conductive sheet assembly being located at one or both ends of the movable portion along a moving direction, and located on a side of the motor having a larger area; the support portion comprising a pair of elastic members, connected to the fixed portion and the movable portion, and providing a restoring force when the movable portion being displaced, the elastic members comprising a first connecting part, an elastic part and a second connecting part, the first connecting part of the elastic member being fixed to the outer frame of the fixed portion, and the second connecting part of the elastic member being fixed to the bracket of the movable portion; the coil set being located between the outer frame and the main magnet set, fixed to the outer frame, with a gap from the main magnet set, the coil set and the main magnet set provide driving to move the movable portion to generate vibration; the secondary magnet set being located on a side of the motor having a larger area, at a position corresponding to the conductive sheet assembly, and with a gap from the conductive sheet assembly, and the conductive sheet assembly and the second magnet set providing the resistance when the movable portion being in motion; the secondary magnet set comprising at least a secondary magnet, and the secondary magnets of the secondary magnet set being magnetized in a direction along a thinner side of the motor. As such, the outer frame has a closed surface, and the secondary magnet set is located inside the closed surface; furthermore, the secondary magnet set may further comprise a magnetic conductive sheet located between the outer frame and the secondary magnet.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
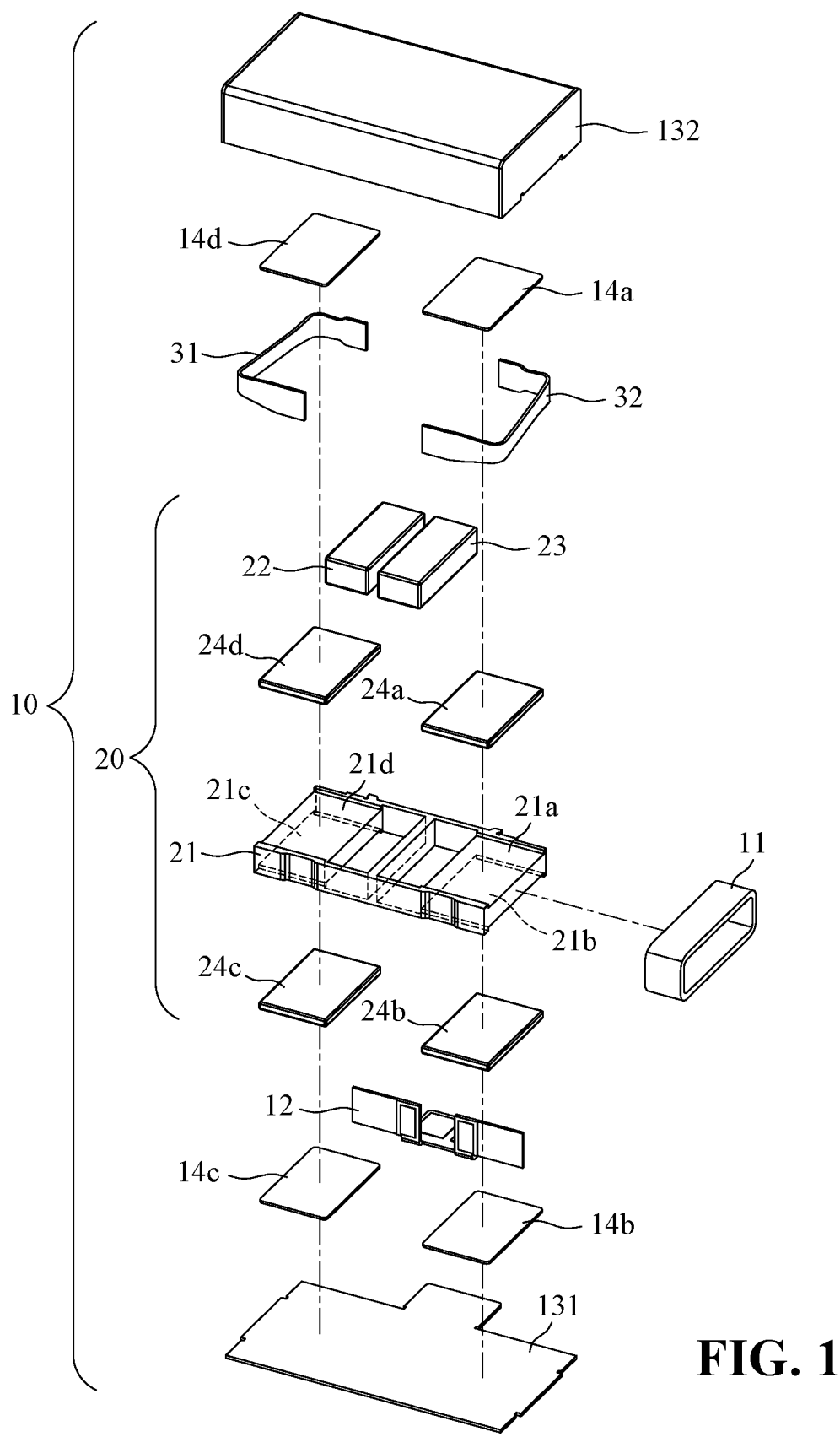
FIG. 1 is an exploded perspective view showing an embodiment of a linear vibration motor of the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present invention provides a linear vibration motor that exhibits a repulsive force generated by an induced current in response to the relative motion of the electric motor when the electric conductor moves with respect to the magnetic field to slow the vibration. The linear vibration motor is formed by an outer frame and a conductive sheet set, and has a fixed portion with a closed inner space housing a coil set and a movable portion with a main magnet set and at least one secondary magnet set and providing inertial mass; the coil set and the configuration of the magnetic field of the main magnet set generate an electromagnetic force (Lorantz force) when energized; the conductive sheet set and the magnetic field configuration of the secondary magnet set cause the conductive sheet set to generate an induced current (Eddy current) to resist the relative motion when moving in the secondary magnet set. Then, the elastic members are used to connect to the fixed portion and the movable portion to support the movable portion, guide the moving direction, and provide a restoring force for the displacement of the movable portion.

Figure 2:
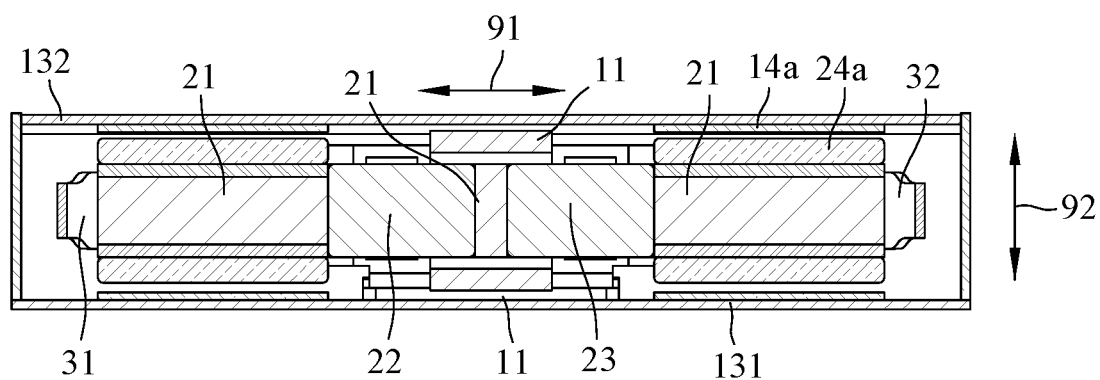
FIG. 2 is a cross-sectional view showing the embodiment of the linear vibration motor of FIG. 1.
Figure 3:
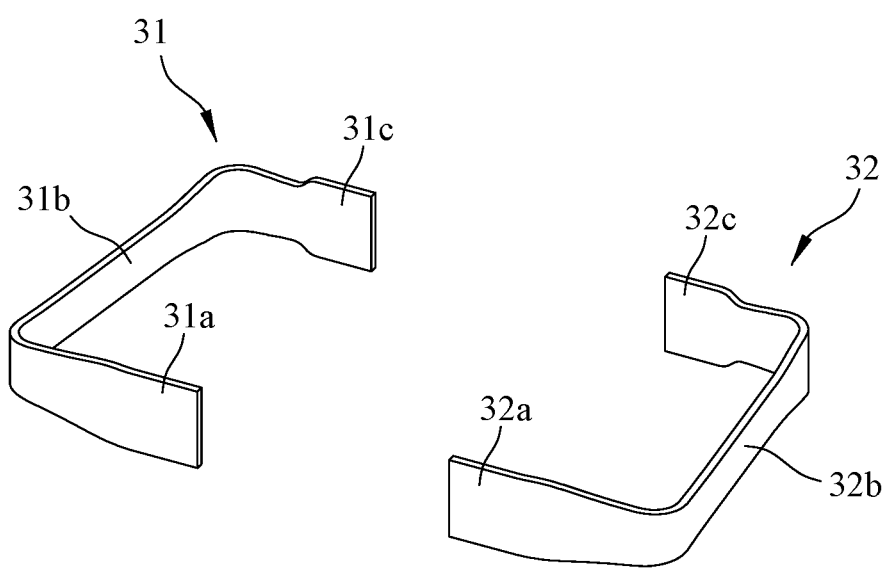
FIG. 3 is a schematic view showing a detail of the elastic member of FIG. 1.

FIG. 1 is an exploded perspective view showing an embodiment of a linear vibration motor of the present invention; and FIG. 2 is a cross-sectional view showing the embodiment of the linear vibration motor of FIG. 1. As shown in FIG. 1 and FIG. 2, a linear vibration motor 100 of the present invention has a substantially rectangular parallelepiped shape, and the longest axis direction is the moving direction 91 of the movable portion (which may be simply referred to as the moving direction or the x-axis), and the two sides of the larger area are defined as the upper and lower sides of the linear vibration motor 100 (z-axis 92). The present invention provides a linear vibration motor 100 having a structure including at least a fixed portion 10, a movable portion 20, and a support portion. The fixed portion 10 further includes an outer frame 131, 132, a coil set 11, and a conductive sheet set 14a-14d; the movable portion 20 includes a bracket 21, a main magnet set 22, 23, and at least a secondary magnet set 24a-24d, and the bracket 21 carries the main magnet set 22, 23 and the secondary magnet set 24a-24d. The main magnet set 22, 23 is located at an intermediate portion of the bracket 21 of the movable portion 20, and the secondary magnet set 24a-24d is located at one end or both ends of the movable portion 20 in a moving direction. The secondary magnet set 24a-24d is located on an upper side or a lower side of the bracket 21 as shown in FIG. 2. The support portion includes a pair of elastic members 31, 32 connected to the fixed portion 10 and the movable portion 20, and provides a restoring force when the movable portion 20 is displaced. The elastic members 31, 32 are respectively located at both ends of the movable portion 20 in the moving direction. FIG. 3 is a detailed view of the elastic members 31, 32 of FIG. 1. As shown in FIG. 3, the elastic members 31, 32 are formed to include a first connecting part 31a, 32a, an elastic part 31b, 32b and a second connecting part 31c, 32c. The first connecting part 31a, 32a of the elastic member 31, 32 is fixed to the outer frame 131, 132 of the fixed portion 10, and the second connecting part 31c, 32c of the elastic members 31, 32 is located on the bracket 21 of the movable portion 20. The coil set 11 is located between the outer frame 131, 132 and the main magnet set 22, 23, and fixed to the outer frame 131, 132, with a gap from the main magnet group 22, 23. The coil set 11 and the main magnet set 22, 23 provide a force to drive the movable portion 20 to generate vibration; wherein the coil set 11 surrounds the main magnet set and is placed at a position symmetrical with the moving direction of the main magnet set. The coil winding direction of the coil set 11 is perpendicular to the moving direction of the movable portion 20. When a current is present in the coil, the magnetic field of the main magnet set 22, 23 produces a driving force in the moving direction 91. The conductive sheet set 14a-14d is located on a side having a larger area of the motor 100, and corresponds to the secondary magnet set 24a-24d, with a gap from the secondary magnet set 24a-24d. Together, the conductive sheet set 14a-14d and the secondary magnet set 24a-24d provide the resistance when the movable portion 20 moves. Each conductive sheet 14a-14d of the conductive sheet set is made of a metal or alloy having a higher conductivity, and the area thereof is no less than the area of the secondary magnet 24a-24d. The linear vibration motor 100 of the present invention further includes a connection line and a terminal 12 that connect the coil set 11 and provide an interface for driving the motor 100. The bracket 21 further includes a receiving surface 21a-21d for respectively receiving the corresponding the secondary magnet 24a-24d. It should be noted that, in this embodiment, the four secondary magnets 24a-24d are disposed at one end or both ends of the moving direction 91 of the movable portion 20, face the surface of the motor 100 having a large area (the receiving surfaces 21a-21d of the bracket 21), and are placed at upper sides, lower sides, or paired up for upper and lower sides; but not limited thereto.

It should be noted that the main magnet set includes at least two main magnets 22, 23, which are arranged in accordance with the moving direction 91 of the movable portion 20, wherein the magnetization directions of the main magnets 22, 23 are parallel to the moving direction 91, and the adjacent main magnets are magnetized in the opposite direction. The magnetic field on the symmetry plane of the two main magnets 22, 23 is the perpendicular to the direction of movement of the movable portion 20.

Figure 4:
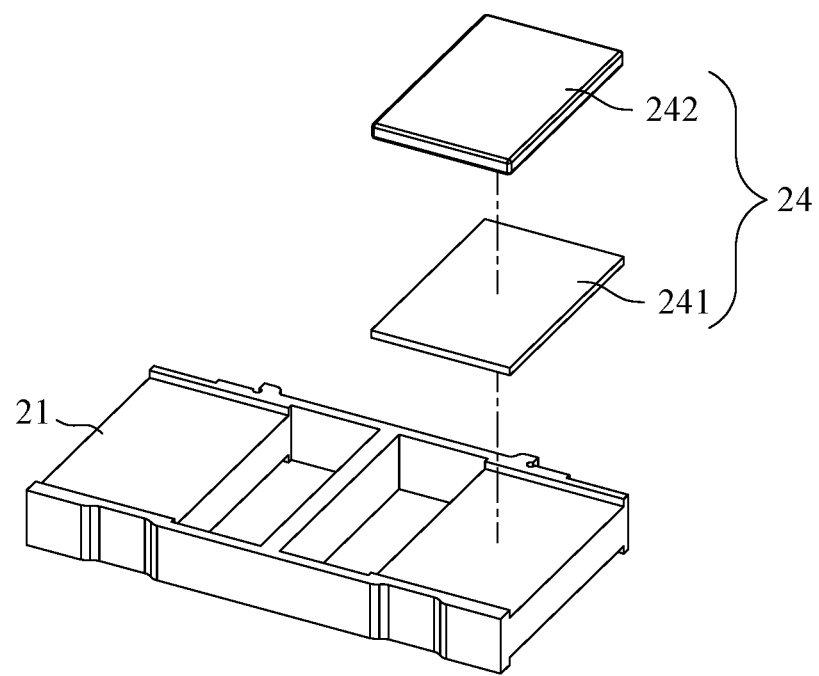
FIG. 4 is a schematic view showing the arrangement of a secondary magnet set and a bracket in the linear vibration motor of the present invention.

FIG. 4 is a schematic view showing the arrangement of a secondary magnet set and a bracket in the linear vibration motor of the present invention. As shown in FIG. 4, the secondary magnet set 24 includes at least one secondary magnet 242 located on the upper side of the bracket 21, and the secondary magnet 242 of the secondary magnet set 24 is magnetized in the direction 92 perpendicular to the receiving surfaces 21a-21d of the bracket 21 along the thinner side of the motor 100, and the magnetization direction may be forward or reverse magnetization. Furthermore, the secondary magnet set 24 may further include a magnetic conductive sheet 241 made of a ferromagnetic material having a high magnetic susceptibility and a saturation magnetization, and the magnetic conductive sheet 241 is located between the bracket 21 and the secondary magnet set 24. The area of the magnetic conductive sheet 241 is at least half of the total area of the associated secondary magnet set 24. The secondary magnet 242 can adsorb the magnetic conductive sheet 241 by magnetic force, and assist to assemble and fix to the bracket 21 of the movable portion 20.

Figure 5:
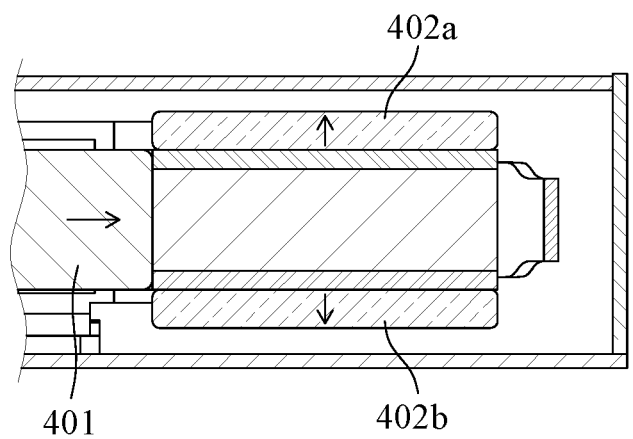
FIG. 5 is a schematic view showing the first embodiment of the secondary magnet set of the present invention.
Figure 6:
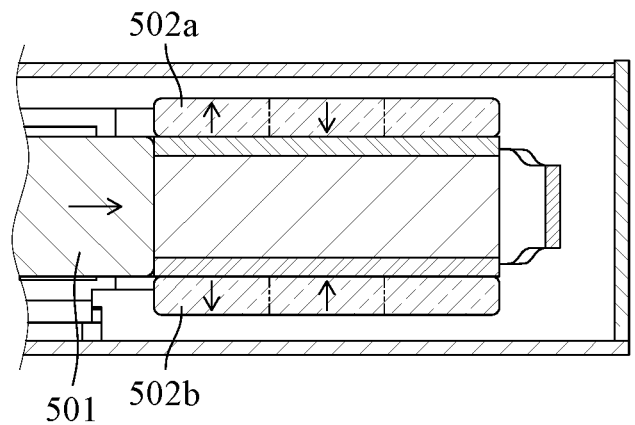
FIG. 6 is a schematic view showing the second embodiment of the secondary magnet set of the present invention.
Figure 7:
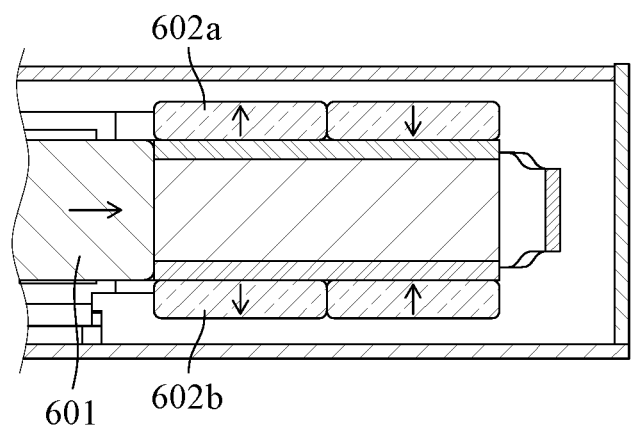
FIG. 7 is a schematic view showing the third embodiment of the secondary magnet set of the present invention.

FIG. 5 is a schematic view showing the first embodiment of the secondary magnet set of the present invention; FIG. 6 is a schematic view showing the second embodiment of the secondary magnet set of the present invention; and FIG. 7 is a schematic view showing the third embodiment of the secondary magnet set of the present invention. As shown in FIG. 5, each secondary magnet set 24 includes a secondary magnet 242 and the secondary magnet 242 is magnetized in a direction with polarity to outer side 402a, 402b of the motor the same as polarity of a nearby main magnet to the outer side 401 of the motor. As shown in FIG. 6, each secondary magnet set 24 comprises a secondary magnet 242, and the secondary magnet is divided into a plurality of regions along the moving direction and each region is magnetized alternately in direction, the adjacent regions have opposite magnetization directions, and the region closest to center of the moving direction is magnetized in a direction with polarity to outer side 502a, 502b of the motor the same as polarity of a nearby main magnet to the outer side 501 of the motor. As shown in FIG. 7, each secondary magnet set 24 comprises a plurality of secondary magnets 242, and the secondary magnet 242 closest to the center of the moving direction is magnetized in a direction with polarity to outer side 602a, 602b of the motor the same as polarity of a nearby main magnet to the outer side 601 of the motor; the remaining secondary magnets 242 are arranged along the moving direction, and the adjacent secondary magnets have opposite magnetization directions. It should be noted that the secondary magnet set generates a magnetic field mainly perpendicular to the surface of the motor having a larger outer surface area, and is also perpendicular to the moving direction. Furthermore, the number and arrangement of the secondary magnets in the secondary magnet set of the present invention can be adjusted according to application requirements, and is not limited thereto.

Figure 8:
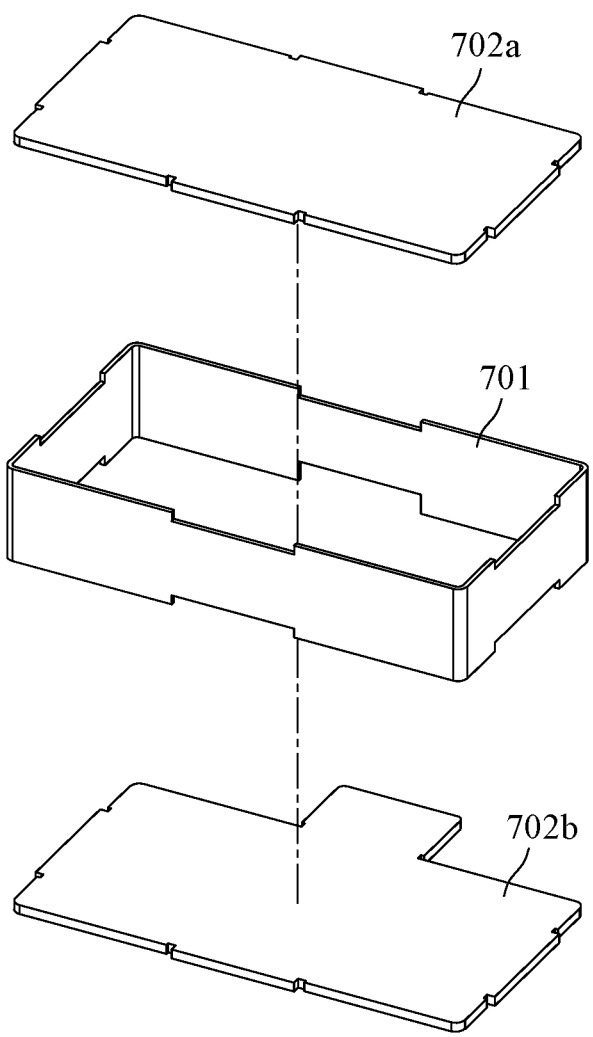
FIG. 8 is a schematic illustration of another embodiment of the outer frame of the invention.

It should be noted that, in the embodiment of FIG. 1, the outer frames 131, 132 have a closed surface, and the conductive sheet set 14a-14d are located inside the closed surface; and the coil set 11 is located between the closed surface of the outer frames 131, 132 and the main magnet set 22, 23. However, the embodiments of the outer frame of the present invention are not limited thereto. FIG. 8 is a schematic illustration of another embodiment of the outer frame of the invention. As shown in FIG. 8, the conductive sheet assembly 702a, 702b and the semi-closed outer frame 701 form a closed space; the coil set 11 is located between the closed surface and the main magnet set 22, 23. The magnetic field established by the secondary magnet perpendicular to the side of the motor having a larger area the outer shape of the motor is mainly covered by the conductive sheet assembly 14a-14d. When the secondary magnet and the magnetic field established by the secondary magnet move with respect to the conductive sheet, an induced current distribution is generated on the conductive sheet and the interaction between the induced current and the magnetic field suppresses the relative motion and exhibits a repulsive force to provide the resistance when the movable portion moves.

It should be noted that in the embodiment of FIG. 1, since the conductive sheet assembly and the secondary magnet set provide the resistance when the movable portion moves, the arrangement positions of the conductive sheet assembly and the secondary magnet set can be exchanged, as long as there is a gap in-between.

As such, the present invention also provides another linear vibration motor, which includes: a fixed portion, a movable portion, and a supporting portion; the fixed portion further comprising an outer frame, a coil set, and at least a secondary magnet set; the movable portion comprising a bracket, a main magnet set, and a conductive sheet assembly, the bracket carrying the main magnet set and the conductive sheet assembly, the main magnet set being located at an intermediate portion of the bracket of the movable portion, and the conductive sheet assembly being located at one or both ends of the movable portion along a moving direction, and located on a side of the motor having a larger area; the support portion comprising a pair of elastic members, connected to the fixed portion and the movable portion, and providing a restoring force when the movable portion being displaced, the elastic members comprising a first connecting part, an elastic part and a second connecting part, the first connecting part of the elastic member being fixed to the outer frame of the fixed portion, and the second connecting part of the elastic member being fixed to the bracket of the movable portion; the coil set being located between the outer frame and the main magnet set, fixed to the outer frame, with a gap from the main magnet set, the coil set and the main magnet set provide driving to move the movable portion to generate vibration; the secondary magnet set being located on a side of the motor having a larger area, at a position corresponding to the conductive sheet assembly, and with a gap from the conductive sheet assembly, and the conductive sheet assembly and the second magnet set providing the resistance when the movable portion being in motion; the secondary magnet set comprising at least a secondary magnet, and the secondary magnets of the secondary magnet set being magnetized in a direction along a thinner side of the motor. As such, the outer frame has a closed surface, and the secondary magnet set is located inside the closed surface. The distance in the moving direction between the secondary magnet set and the nearby main magnet set is greater than an allowable motion displacement of the movable portion. The allowable motion displacement of the movable portion refers to a maximum distance that the movable portion can move according to design. Furthermore, the secondary magnet set may further comprise a magnetic conductive sheet located between the outer frame and the secondary magnet.

In summary, the linear vibration motor of the present invention, by disposing an electric conductor, generates an induced current when the electric conductor moves with respect to a magnetic field, thereby resisting the relative motion and exhibiting a repulsive force to slow down the vibration.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A linear vibration motor, comprising at least: a fixed portion, a movable portion, and a supporting portion;
    the fixed portion further comprising an outer frame, a coil set, and a conductive sheet assembly;
    the movable portion comprising a bracket, a main magnet set, and at least a secondary magnet set, the bracket carrying the main magnet set and the secondary magnet set, the main magnet set being located at an intermediate portion of the bracket of the movable portion, and the secondary magnet set being located at one or both ends of the movable portion along a moving direction, and the secondary magnet set comprising at least one secondary magnet, and the at least one secondary magnet of the secondary magnet set being placed on a receiving surface at an upper side or a lower side of the bracket and magnetized in a direction perpendicular to the receiving surface of the bracket; and
    the supporting portion comprising a pair of elastic members, connected to the fixed portion and the movable portion, and providing a restoring force when the movable portion is displaced;
    wherein, each elastic member comprises a first connecting part, an elastic part and a second connecting part, the first connecting part of the elastic member being fixed to the outer frame of the fixed portion, and the second connecting part of the elastic member being fixed to the bracket of the movable portion;
    the coil set is located between the outer frame and the main magnet set, fixed to the outer frame, with a gap from the main magnet set, the coil set and the main magnet set driving the movable portion to generate vibration; and the conductive sheet assembly is located between the outer frame and the secondary magnet set on the upper or lower side of the bracket, at a position corresponding to the secondary magnet set, and with a gap from the secondary magnet set, the conductive sheet assembly and the second magnet set providing resistance when the movable portion is in motion.

2. The linear vibration motor as claimed in claim 1, wherein the main magnet set comprises at least two main magnets arranged according to the moving direction of the movable portion, wherein a magnetization direction of the main magnets is parallel to the moving direction, and adjacent main magnets are magnetized in opposite directions.

3. The linear vibration motor as claimed in claim 1, wherein each secondary magnet set comprises a secondary magnet and the secondary magnet is magnetized in a direction with polarity to outside of the motor the same as polarity of a nearby main magnet to the outside of the motor.

4. The linear vibration motor as claimed in claim 1, wherein each secondary magnet set comprises a secondary magnet, and the secondary magnet is divided into a plurality of regions along the moving direction and each region is magnetized alternately in direction, adjacent regions have opposite magnetization directions, and a region closest to center of the moving direction is magnetized in a direction with polarity to outside of the motor the same as polarity of a nearby main magnet to the outside of the motor.

5. The linear vibration motor as claimed in claim 1, wherein each secondary magnet set comprises a plurality of secondary magnets, and the secondary magnet closest to center of the moving direction is magnetized in a direction with polarity to outside of the motor the same as polarity of a nearby main magnet to the outside of the motor; remaining secondary magnets are arranged along the moving direction, and adjacent secondary magnets have opposite magnetization directions.

6. The linear vibration motor as claimed in claim 1, wherein the secondary magnet set further comprises a magnetic conductive sheet made of a ferromagnetic material having a high magnetic susceptibility and a saturation magnetization, the magnetic conductive sheet being located between the bracket and the secondary magnet set, and an area of the magnetic conductive sheet is greater than half of a total area of an associated secondary magnet set.

7. The linear vibration motor as claimed in claim 1, wherein the outer frame comprises a closed surface, and the conductive sheet assembly is located inside the closed surface; the coil set is located between the closed surface of the outer frame and the main magnet set.

8. The linear vibration motor as claimed in claim 1, wherein the outer frame has a semi-closed surface, and the conductive sheet assembly forms a closed surface with the semi-closed surface; the coil set is located between the closed surface and the main magnet set.

9. The linear vibration motor as claimed in claim 1, wherein each conductive sheet of the conductive sheet assembly is made of a metal or alloy having a higher electrical conductivity, and an area thereof is no less than an area of a corresponding secondary magnet set.

10. The linear vibration motor as claimed in claim 1, wherein the coil set surrounds the main magnet set and is placed in a position symmetrical with the moving direction of the main magnet set.

11. The linear vibration motor as claimed in claim 1, further comprising a connection line and at least one terminal to connect the coil set and a circuit for driving the motor.

12. A linear vibration motor, comprising at least: a fixed portion, a movable portion, and a supporting portion;
the fixed portion further comprising an outer frame, a coil set, and at least a secondary magnet set;
the movable portion comprising a bracket, a main magnet set, and a conductive sheet assembly, the bracket carrying the main magnet set and the conductive sheet assembly, the main magnet set being located at an intermediate portion of the bracket of the movable portion, and the conductive sheet assembly being located at one or both ends of the movable portion along a moving direction, and placed on a receiving surface at an upper side or a lower side of the bracket; and
the supporting portion comprising a pair of elastic members, connected to the fixed portion and the movable portion, and providing a restoring force when the movable portion is displaced;
wherein each of the elastic members comprises a first connecting part, an elastic part and a second connecting part, the first connecting part of the elastic member being fixed to the outer frame of the fixed portion, and the second connecting part of the elastic member being fixed to the bracket of the movable portion;
the coil set is located between the outer frame and the main magnet set, fixed to the outer frame, with a gap from the main magnet set, the coil set and the main magnet set driving the movable portion to generate vibration;
the outer frame has a closed surface, the secondary magnet set being located inside the closed surface;
the secondary magnet set is located between the outer frame and the conductive sheet assembly on the upper or lower side of the bracket, at a position corresponding to the conductive sheet assembly, and with a gap from the conductive sheet assembly, the conductive sheet assembly and the second magnet set providing resistance when the movable portion is in motion; the secondary magnet set comprising at least one secondary magnet, and the at least one secondary magnet of the secondary magnet set being magnetized in a direction perpendicular to the receiving surface of the bracket; and
a distance in the moving direction between the secondary magnet set and the nearby main magnet set is greater than an allowable motion displacement of the movable portion.

13. The linear vibration motor as claimed in claim 12, wherein the main magnet set comprises at least two main magnets arranged according to the moving direction of the movable portion, wherein a magnetization direction of the main magnets is parallel to the moving direction, and adjacent main magnets are magnetized in opposite directions.

14. The linear vibration motor as claimed in claim 12, wherein each secondary magnet set comprises a secondary magnet and the secondary magnet is magnetized in a direction with polarity to outside of the motor the same as polarity of a nearby main magnet to the outside of the motor.

15. The linear vibration motor as claimed in claim 12, wherein each secondary magnet set comprises a secondary magnet, and the secondary magnet is divided into a plurality of regions along the moving direction and each region is magnetized alternately in direction, adjacent regions have opposite magnetization directions, and a region closest to center of the moving direction is magnetized in a direction with polarity to outside of the motor the same as polarity of a nearby main magnet to the outside of the motor.

16. The linear vibration motor as claimed in claim 12, wherein each secondary magnet set comprises a plurality of secondary magnets, and the secondary magnet closest to center of the moving direction is magnetized in a direction with polarity to outside of the motor the same as polarity of a nearby main magnet to the outside of the motor; remaining secondary magnets are arranged along the moving direction, and adjacent secondary magnets have opposite magnetization directions.

17. The linear vibration motor as claimed in claim 12, wherein the secondary magnet set further comprises a magnetic conductive sheet made of a ferromagnetic material having a high magnetic susceptibility and a saturation magnetization, the magnetic conductive sheet being located between the outer frame of the fixed portion and the secondary magnet set, and an area of the magnetic conductive sheet is greater than half of a total area of an associated secondary magnet set.

18. The linear vibration motor as claimed in claim 12, wherein each conductive sheet of the conductive sheet assembly is made of a metal or alloy having a higher electrical conductivity, and an area thereof is no less than an area of a corresponding secondary magnet set.

19. The linear vibration motor as claimed in claim 12, wherein the coil set surrounds the main magnet set and is placed in a position symmetrical with the moving direction of the main magnet set.

20. The linear vibration motor as claimed in claim 12, further comprising a connection line and at least one terminal to connect the coil set and a circuit for driving the motor.

* * * * *